(12) United States Patent
Shibayama et al.

(10) Patent No.: US 10,770,210 B2
(45) Date of Patent: *Sep. 8, 2020

(54) FERRITE COMPOSITION AND ELECTRONIC DEVICE

(71) Applicant: TDK CORPORATION, Tokyo (JP)

(72) Inventors: Takeshi Shibayama, Tokyo (JP); Asuka Murai, Tokyo (JP); Yukio Takahashi, Tokyo (JP); Takashi Suzuki, Tokyo (JP); Hiroyuki Tanoue, Tokyo (JP); Masaki Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 15/708,625

(22) Filed: Sep. 19, 2017

(65) Prior Publication Data

US 2018/0096768 A1   Apr. 5, 2018

(30) Foreign Application Priority Data

Sep. 30, 2016 (JP) ................................ 2016-194621

(51) Int. Cl.
| | |
|---|---|
| *H01F 1/34* | (2006.01) |
| *C04B 35/626* | (2006.01) |
| *C04B 35/26* | (2006.01) |
| *H01F 17/00* | (2006.01) |
| *H01F 41/04* | (2006.01) |

(52) U.S. Cl.
CPC ............ *H01F 1/344* (2013.01); *C04B 35/265* (2013.01); *C04B 35/6261* (2013.01); *H01F 17/0013* (2013.01); *H01F 41/046* (2013.01); *C04B 2235/3277* (2013.01); *C04B 2235/3279* (2013.01); *C04B 2235/3281* (2013.01); *C04B 2235/3284* (2013.01); *C04B 2235/3298* (2013.01); *C04B 2235/3418* (2013.01); *C04B 2235/604* (2013.01); *C04B 2235/608* (2013.01); *C04B 2235/94* (2013.01)

(58) Field of Classification Search
CPC .............................. H01F 1/344; C04B 35/265
See application file for complete search history.

(56) References Cited

U.S. PATENT DOCUMENTS

| | | | |
|---|---|---|---|
| 6,287,479 | B1 | 9/2001 | Tanaka |
| 9,984,799 | B2 | 5/2018 | Wada et al. |
| 10,074,476 | B2 * | 9/2018 | Choto ............... C04B 35/26 |
| 2008/0296528 | A1 | 12/2008 | Sutoh et al. |
| 2015/0097137 | A1 * | 4/2015 | Wada ................. H01F 1/01 |
| | | | 252/62.6 |

FOREIGN PATENT DOCUMENTS

| | | |
|---|---|---|
| JP | H03-93667 A | 4/1991 |
| JP | H09-63826 A | 3/1997 |
| JP | 2000-252112 A | 9/2000 |
| JP | 2006-206347 A | 8/2006 |
| JP | 2008-300548 A | 12/2008 |

* cited by examiner

*Primary Examiner* — C Melissa Koslow
(74) *Attorney, Agent, or Firm* — Oliff PLC

(57) ABSTRACT

A ferrite composition includes a main component and an accessory component. The main component includes 18 to 30 mol % of iron oxide in terms of $Fe_2O_3$, 4 to 14 mol % of copper oxide in terms of CuO, 0 to 6 mol % of zinc oxide in terms of ZnO, and a remaining part of nickel oxide. The accessory component includes 0.30 to 1.83 pts.wt. of silicon compound in terms of $SiO_2$, 2.00 to 10.00 pts.wt. of cobalt compound in terms of $Co_3O_4$, and 1.00 to 3.00 pts.wt. of bismuth compound in terms of $Bi_2O_3$ with respect to 100 pts.wt. of the main component. A cobalt compound content in terms of $Co_3O_4$ divided by a silicon compound content in terms of $SiO_2$ is a value of 5.5 to 30.0.

2 Claims, 3 Drawing Sheets

FERRITE COMPOSITION AND ELECTRONIC DEVICE

BACKGROUND OF THE INVENTION

1. Field of the Invention

The present invention relates to a ferrite composition suitable for manufacturing multilayer inductors or so and an electronic device having a ferrite sintered body composed of the composition.

2. Description of the Related Art

In recent years, miniaturization and higher frequency of DC-DC converters have been advancing, and there exists a DC-DC converter that is driven by a frequency of about a few tens of MHz to several hundred MHz. Inductors applied to DC-DC converters with miniaturization and high frequency require frequency characteristics for operation as inductors even in high frequency regions and DC current superposition characteristics hardly changing operation even if a large current is applied.

NiCuZn ferrites added with cobalt have been previously proposed as ferrite compositions used for inductors applied to DC-DC converters. There is a technique under consideration for improving magnetic anisotropy and frequency characteristics of permeability by adding cobalt to the NiCuZn ferrites.

However, it has been previously known that the NiCuZn ferrites added with cobalt tend to have a decreased sinterability and a deteriorated temperature characteristic, compared to NiCuZn ferrites containing no cobalt. The following method is proposed for overcoming the above disadvantages of addition of cobalt.

Patent Document 1 overcomes lowering of sinterability by adding bismuth compound, such as bismuth oxide, to a NiCuZn ferrite along with cobalt compound. Moreover, Patent Document 1 attempts to improve temperature characteristic by adding zirconium compound to the NiCuZn ferrite.

Patent Document 2 attempts to obtain a high Q value, a favorable temperature characteristic, and a high anti-stress characteristic by adding $Co_3O_4$, $SiO_2$, and $Bi_2O_3$ to a NiCuZn ferrite.

Patent Document 3 attempts to obtain a ferrite composition excellent in frequency characteristics by having relatively small amounts of $Fe_2O_3$ and ZnO in a NiCuZn ferrite and further adding CoO thereto.

Examples of Patent Document 1, however, disclose values of initial permeability $\mu_i$, but fail to disclose how high frequency a value of permeability is maintained to. According to the Snoek's limit, a value of permeability is normally maintained to a high frequency as a value of initial permeability $\mu_i$ is lower. When an additive is added, permeability may be maintained to a high frequency equal to or higher than the Snoek's limit, or on the contrary, permeability is decreased at a low frequency equal to or lower than the Snoek's limit. Thus, initial permeability $\mu_i$ functions as a measure of frequency characteristic, but lacks evidence of evaluation standard of frequency characteristic. Examples of Patent Document 1 are thereby unclear with respect to frequency characteristic.

Incidentally, the Snoek's limit is expressed by Formula (1) shown below. In Formula (1), $f_r$ is a rotating magnetization resonance frequency, $\mu_i$ is an initial permeability, $\gamma$ is a gyro magnetic constant, and $M_s$ is a saturation magnetization.

$$f_r(\mu_i-1)=|\gamma|\times(M_s/3\pi) \qquad \text{Formula (1)}$$

Patent Document 1 discloses ratios of an initial permeability at 20° C. to an initial permeability at 85° C. with respect to temperature change in permeability when a zirconium oxide is added, but the smallest ratio among the ratios of an initial permeability at 20° C. to an initial permeability at 85° C. in Examples of Patent Document 1 is 1.45. This result is too large for prevention of change in initial permeability with respect to temperature change.

In Patent Document 2, no value of initial permeability is disclosed, and frequency characteristic is unclear. In Patent Document 3, temperature characteristic is unclear. In Patent Documents 1 to 3, DC current superposition characteristic is unclear.

In Patent Documents 1 to 3, it is accordingly unclear whether the NiCuZn ferrites are excellent in all of frequency characteristic, DC current superposition characteristic, and temperature characteristic.

Patent Document 1: JP 2000-252112 A
Patent Document 2: JP 2006-206347 A
Patent Document 3: JP 2008-300548 A

SUMMARY OF THE INVENTION

The prevent invention has been achieved under such circumstances. It is an object of the invention to provide a ferrite composition having favorable initial permeability, resistivity, frequency characteristic, and temperature characteristic, and an electronic device using the ferrite composition.

To achieve the above object, the ferrite composition according to the present invention is a ferrite composition including a main component and an accessory component, wherein
the main component includes:
  18 to 30 mol % of iron oxide in terms of $Fe_2O_3$;
  4 to 14 mol % of copper oxide in terms of CuO;
  0 to 6 mol % of zinc oxide in terms of ZnO; and
  a remaining part of nickel oxide,
the accessory component includes:
  0.30 to 1.83 pts.wt. of silicon compound in terms of $SiO_2$;
  2.00 to 10.00 pts.wt. of cobalt compound in terms of $Co_3O_4$; and
  1.00 to 3.00 pts.wt. of bismuth compound in terms of $Bi_2O_3$ with respect to 100 pts.wt. of the main component, and
  a cobalt compound content in terms of $Co_3O_4$ divided by a silicon compound content in terms of $SiO_2$ is a value of 5.5 to 30.0.

In the ferrite composition according to the present invention, the oxides constituting the main component are contained within the above ranges, and silicon compound, cobalt compound, and bismuth compound are contained within the above ranges as the accessory component. The ferrite composition according to the present invention is thereby excellent in initial permeability $\mu_i$, resistivity $\rho$, frequency characteristic, and temperature characteristic of initial permeability $\mu_i$ after sintering.

Such an effect is a composite effect obtained by setting the main component to the predetermined range and further setting each constituent content to the predetermined range.

The electronic device according to the present invention includes a ferrite sintered body composed of the above ferrite composition.

Incidentally, the ferrite sintered body composed of the ferrite composition according to the present invention is favorably used for multilayer inductors, multilayer L-C filters, multilayer common mode filters, composite electronic devices of other lamination method, and the like. For example, the ferrite sintered body composed of the ferrite composition according to the present invention is favorably used for NFC coils, multilayer impedance elements, and multilayer transformers.

DESCRIPTION OF THE PREFERRED EMBODIMENTS

Hereinafter, the present invention will be described based on an embodiment shown in the figures.

Figure 1:
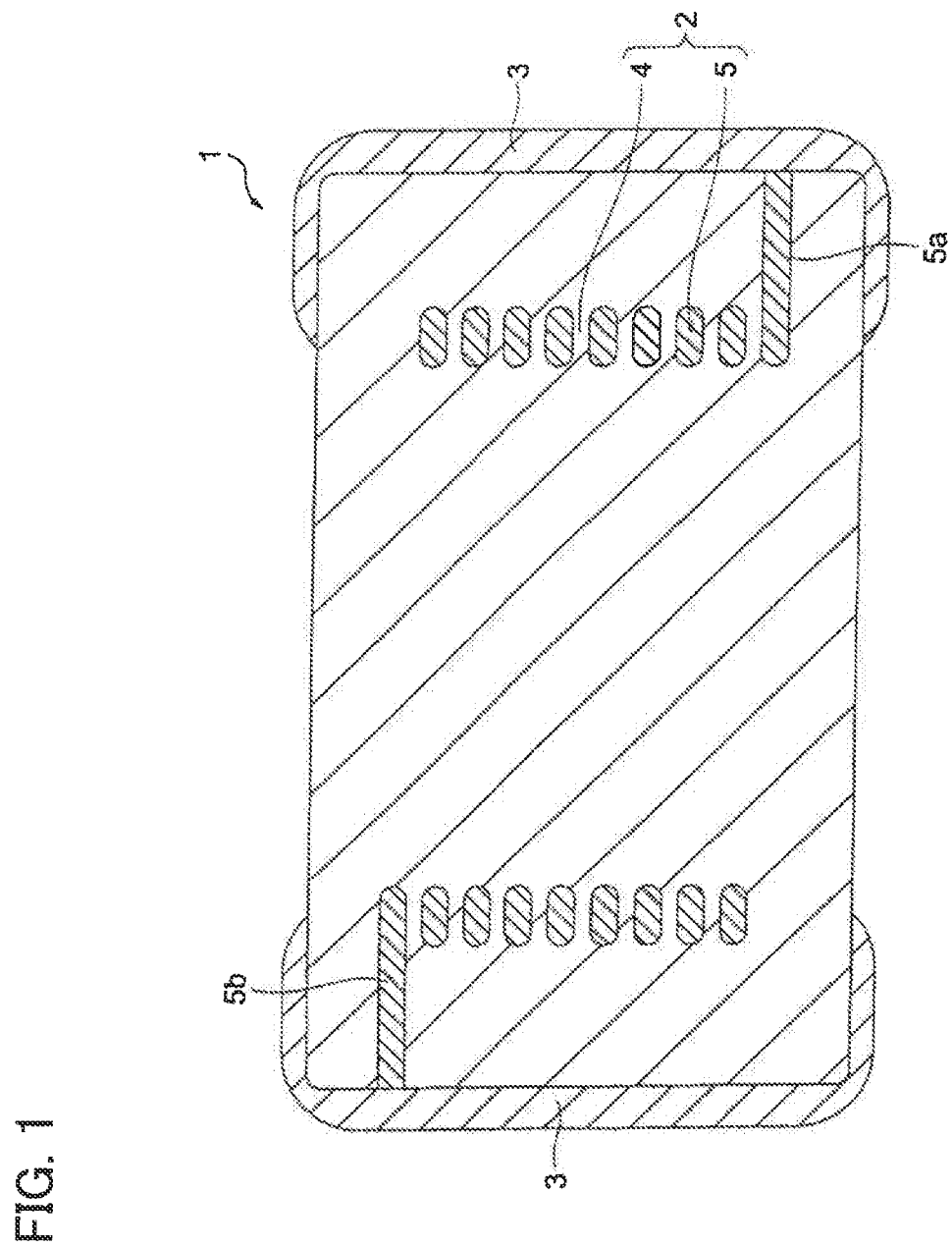
FIG. 1 is a cross sectional view of a multilayer inductor according to an embodiment of the present invention.

As shown in FIG. 1, a multilayer inductor 1 according to an embodiment of the present invention has an element 2 and terminal electrodes 3. The element 2 is obtained by firing a green laminated body where a coil conductor 5 is three-dimensionally and spirally formed via ferrite layers 4. The ferrite layers 4 are composed of a ferrite composition according to an embodiment of the present invention. The terminal electrodes 3 are formed on both sides of the element 2, and the multilayer inductor 1 is obtained by being connected with the terminal electrodes 3 via leading electrodes 5a and 5b. The element 2 has any shape, but normally has a parallelepiped shape. The element 2 has any size, and has an appropriate size based on usage.

The coil conductor 5 and the leading electrodes 5a and 5b are made of any material, such as Ag, Cu, Au, Al, Pd, and Pd/Ag alloy, and may be added with Ti compound, Zr compound, Si compound, etc.

The ferrite composition according to the present embodiment is a Ni—Cu based ferrite or a Ni—Cu—Zn based ferrite. The ferrite composition according to the present embodiment contains a main component of iron oxide, copper oxide, and nickel oxide, and may further contain zinc oxide.

In 100 mol % of the main component, an iron oxide content is 18.0 to 30.0 mol % in terms of $Fe_2O_3$. When an iron oxide content is too large or too small, sinterability deteriorates, and a sintering density at the time of low temperature sintering particularly tends to decrease. When an iron oxide content is too small, initial permeability $\mu_i$ tends to decrease. When an iron oxide content is too large, frequency characteristic deteriorates, and $\mu''$ startup frequency mentioned below tends to decrease. When an iron oxide content is too large, temperature characteristic of initial permeability $\mu_i$ also tends to deteriorate.

In 100 mol % of the main component, a copper oxide content is 4 to 14 mol % in terms of CuO. When a copper oxide content is too small, sinterability deteriorates, and a sintering density at the time of low temperature sintering particularly tends to decrease. As a result, resistivity ρ and temperature characteristic of initial permeability $\mu_i$ tend to deteriorate. When a copper oxide content is too large, initial permeability $\mu_i$ tends to decrease.

In 100 mol % of the main component, a zinc oxide content is 0 to 6.0 mol % in terms of ZnO. That is, the main component may contain no zinc oxide. Incidentally, the larger a zinc oxide content is, the further initial permeability tends to increase, and a higher initial permeability is suitable for inductors. When a zinc oxide content is too large, however, Curie temperature and $\mu''$ startup frequency tend to decrease.

The main component has a remaining part composed of nickel oxide.

In addition to the main component, the ferrite composition according to the present embodiment contains an accessory component of silicon compound, cobalt compound, and bismuth compound. Incidentally, in addition to oxides, each compound may be any kind of compound to be an oxide after firing.

With respect to 100 pts.wt. of the main component, a silicon compound content is 0.30 to 1.83 pts.wt. in terms of $SiO_2$. When silicon compound is contained within a predetermined range, the ferrite composition has an improved temperature characteristic. When a silicon compound content is too small, temperature characteristic of initial permeability $\mu_i$ tends to decrease. When a silicon compound content is too large, sinterability deteriorates, and a sintering density at the time of low temperature sintering particularly tends to decrease. Moreover, when a silicon compound content is too large, initial permeability $\mu_i$ and resistivity ρ tend to decrease.

The reason why temperature characteristic improves by addition of silicon compound will be explained. Silicon compound, such as silicon oxide, has a small linear expansion coefficient compared to that of NiCuZn ferrite particles. That is, when a ferrite composition is formed by adding a silicon compound to a NiCuZn ferrite, the added silicon compound applies a stress to the NiCuZn ferrite in advance. The present inventors consider that there is the stress generated by the existence of silicon compound, and this thereby reduces influence of a stress generated by temperature change and improves temperature characteristic.

With respect to 100 pts.wt. of the main component, a bismuth compound content is 1.00 to 3.00 pts.wt. in terms of $Bi_2O_3$. Silicon compound mentioned above and cobalt compound mentioned below have an effect on decrease in sinterability. On the other hand, bismuth compound enhances sinterability and achieves firing at a temperature of 900° C. or less. When a bismuth compound content is too small, sinterability deteriorates, and a sintering density at the time of low temperature sintering particularly tends to decrease. Moreover, when a bismuth compound content is too small, resistivity ρ tends to decrease in accordance with deterioration of sinterability. When a bismuth compound content is too large, resistivity ρ tends to decrease.

With respect to 100 pts.wt. of the main component, a cobalt compound content is 2.00 to 10.00 pts.wt. in terms of $Co_3O_4$. When cobalt compound is contained within a predetermined range, frequency characteristic improves, $\mu''$ startup frequency improves, and DC current superposition characteristic improves. That is, inductance lowering at the time of DC current superposition becomes small. When a cobalt compound content is too small, frequency characteristic deteriorates, $\mu''$ startup frequency tends to decrease, and resistivity ρ also tends to decrease. When a cobalt compound content is too large, sinterability deteriorates, a sintering density at the time of low temperature sintering particularly tends to decrease, initial permeability $\mu_i$ consequently tends to decrease as well, and temperature characteristic of initial permeability $\mu_i$ tends to deteriorate.

Moreover, in the ferrite composition according to the present embodiment, a cobalt compound content in terms of $Co_3O_4$ based on weight divided by a silicon compound content in terms of $SiO_2$ based on weight is a value (hereinafter, referred as to Co/Si) of 5.5 to 30.0.

The above limitation of Co/Si shows that a permissible range of a cobalt compound content increases or decreases by a silicon compound content. Even if a cobalt compound content is 10.0 pts.wt. or less, when a silicon compound content is small and Co/Si is thereby more than 30.0, temperature characteristic of initial permeability $\mu_i$ tends to deteriorate. Even if a cobalt compound content is 2.0 pts.wt. or more, when Co/Si is less than 5.5, resistivity $\rho$ and initial permeability $\mu_i$ tend to decrease. Moreover, in this case, frequency characteristic decreases and $\mu''$ startup frequency decreases, compared to samples having a similar permeability.

In the ferrite composition according to the present embodiment, the main component has a composition range controlled to the above range, and all of silicon compound, bismuth compound, and cobalt compound mentioned above are contained within the ranges of the present invention as the accessory component. It is consequently possible to decrease a sintering temperature and use a metal having a relatively low melting point, such as Ag, as an internal conductor to be fired integrally. Moreover, a ferrite sintered body obtained by a low temperature firing has a high initial permeability, a favorable frequency characteristic, a high resistivity $\rho$, a favorable DC current superposition, and a favorable temperature characteristic. In particular, $\mu''$ startup frequency and temperature characteristic of initial permeability $\mu_i$ are favorable due to interaction between cobalt compound and silicon compound.

Incidentally, the above effect cannot be obtained sufficiently if any one or more of silicon compound, bismuth compound, and cobalt compound are not contained or if the content thereof is out of the range of the present invention. That is, the above effect is conceived to be a composite effect obtained only after predetermined amounts of silicon compound, bismuth compound, and cobalt compound are contained at the same time.

In addition to the above accessory component, the ferrite composition according to the present embodiment may further contain an additional component of manganese oxide, such as $Mn_3O_4$, zirconium oxide, tin oxide, magnesium oxide, glass compound, and the like within a range where the effect of the present invention is not disturbed. An additional component content is not limited, and is about 0.05 to 10 wt. %, for example.

Moreover, the ferrite composition according to the present embodiment may contain oxides of elements of inevitable impurities.

Specifically, examples of the elements of inevitable impurities include C, S, Cl, As, Se, Br, Te, I, etc., typical metal elements of Li, Na, Mg, Al, Ca, Ga, Ge, Sr, Cd, In, Sb, Ba, Pb, etc., and transition metal elements of Sc, Ti, V, Cr, Y, Nb, Mo, Pd, Ag, Hf, and Ta. The oxides of elements of inevitable impurities may be contained in the ferrite composition according to the present embodiment if their content is about 0.05 wt. % or less.

The ferrite composition according to the present embodiment has ferrite particles and crystal grain boundaries existing between adjacent crystal particles. The crystal particles preferably have an average crystal particle size of 0.2 to 1.5 µm.

Next, frequency characteristic of the ferrite composition of the present invention will be described.

The frequency characteristic of the ferrite composition of the present invention shows whether permeability can be maintained to a high frequency.

Figure 3:
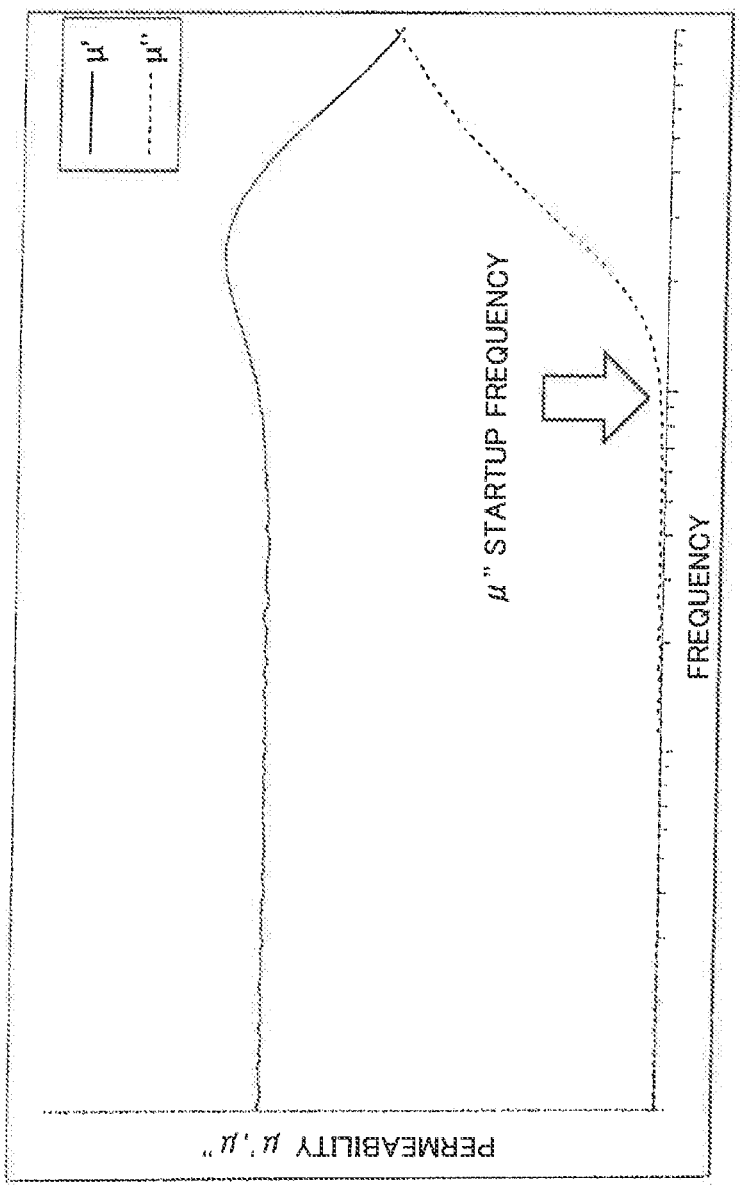
FIG. 3 is a schematic view of frequency characteristics of permeability of a NiCuZn ferrite.

For explanation of the frequency characteristic of the ferrite composition of the present invention, a schematic view with respect to a normal NiCuZn ferrite is shown in FIG. 3, whose horizontal axis is frequency and vertical axis is real part $\mu'$ and imaginary part $\mu''$ of complex permeability.

In low frequency regions, $\mu'$ is approximately constant even if frequency changes, and $\mu''$ is approximately constant around zero. The frequency characteristic of the ferrite composition of the present invention shows a behavior of $\mu''$ rising from zero when increasing frequency and reaching a specific frequency or more. In the present application, a frequency of $\mu''>0.1$ is determined as a $\mu''$ startup frequency.

In a region whose frequency is equal to or higher than a $\mu''$ startup frequency, Q value decreases, and the ferrite composition of the present invention is hard to be used as an inductor. Thus, the ferrite composition of the present invention has a higher upper limit of frequency capable of use as an inductor as a $\mu''$ startup frequency is higher. The ferrite composition of the present invention has a more favorable frequency characteristic as a $\mu''$ startup frequency is higher. Hereinafter, a $\mu''$ startup frequency may be referred to as f.

Next, a manufacturing method of the ferrite composition according to the present embodiment will be described. First, starting materials (raw materials of the main component and raw materials of the accessory component) are weighed at a predetermined composition ratio and mixed, and a raw material mixture is obtained. The starting materials are mixed by a wet mixing using a ball mill, a dry mixing using a dry mixer, or the like. Incidentally, the starting materials preferably have an average particle size of 0.05 to 1.0 µm.

The raw materials of the main component include iron oxide ($\alpha$-$Fe_2O_3$), copper oxide (CuO), nickel oxide (NiO), zinc oxide (ZnO) as needed, composite oxide, and the like. Moreover, various kinds of compounds to be the above-mentioned oxides or composite oxide by firing may be used. Examples of compounds or so to be the above-mentioned oxides by firing include metal simple substance, carbonate, oxalate, nitrate, hydroxide, halide, and organometallic compound.

The raw materials of the accessory component include silicon oxide, bismuth oxide, and cobalt oxide. Any oxide, such as composite oxide, to be the raw materials of the accessory component may be used. Moreover, various kinds of compounds to be the above-mentioned oxides or composite oxide by firing may be used. Examples of the above-mentioned oxides by firing include metal simple substance, carbonate, oxalate, nitrate, hydroxide, halide, and organometallic compound.

Incidentally, $Co_3O_4$, which is a form of cobalt oxide, is preferable as a raw material of cobalt oxide because $Co_3O_4$ is easy to be stored and handled and has a stable valence even in the air.

Next, the raw material mixture is calcined, and a calcined material is obtained. The calcination causes pyrolysis of the raw materials, homogenization of the components, formation of the ferrite, disappearance of ultrafine particles by sintering, and grain growth to moderate particle size, and is performed for conversion of the raw material mixture into a formation suitable to post processes. The calcination is performed preferably at a temperature of 500 to 900° C. normally for about 2 to 15 hours. The calcination may be conducted in an atmosphere whose oxygen partial pressure is lower than that of the air, although calcination is normally conducted in the air. Incidentally, the raw materials of the main component and the raw materials of the accessory component may be mixed before the calcination or after the calcination.

Next, the calcined material is pulverized, and a pulverized material is obtained. This pulverization is conducted for breaking down aggregation of the calcined material and turning it into a powder having an appropriate sinterability. When the calcined material has a large mass, a coarse pulverization is conducted, and a wet pulverization is then conducted using a ball mill, an attritor, or the like. This wet pulverization is conducted until the pulverized material preferably has an average particle size of about 0.1 to 1.0 μm.

A multilayer inductor according to the present embodiment is manufactured using the obtained pulverized material. The multilayer inductor is manufactured by any method, but hereinafter is manufactured by a sheet method.

First, the obtained pulverized powder is turned into a slurry along with a solvent and an additive of a binder or so, and a paste is prepared. Then, a green sheet is formed using the paste. Next, the formed green sheet is machined to a predetermined shape, and a multilayer inductor according to the present embodiment is obtained via a debinding step and a firing step. The firing is conducted at a temperature equal to or lower than melting points of the coil conductor 5 and the leading electrodes 5a and 5b. For example, when the coil conductor 5 and the leading electrodes 5a and 5b are Ag (melting point: 962° C.), the firing is conducted preferably at a temperature of 850 to 920° C. normally for about 1 to 5 hours. The firing may be conducted in the air or in an atmosphere whose oxygen partial pressure is lower than that of the air. The multilayer inductor thus obtained is composed of the ferrite composition according to the present embodiment.

Figure 2:
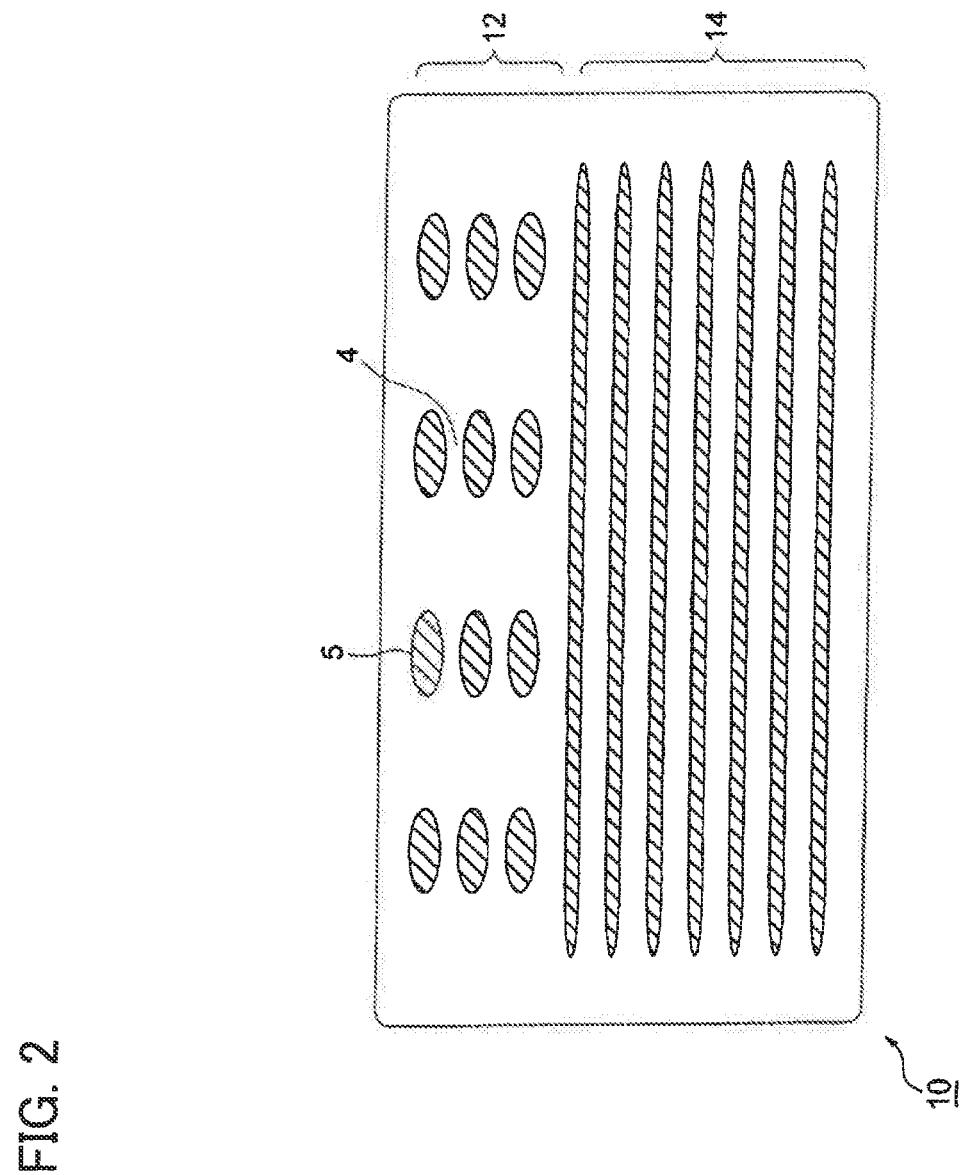
FIG. 2 is a cross sectional view of an LC composite electronic device according to an embodiment of the present invention.

The embodiment of the present invention has been accordingly described, but the present invention is not limited to the embodiment at all, and needless to say, may be carried out in various embodiments within the scope not deviating from the purpose of the present invention. For example, the ferrite composition of the present invention may be used as the ferrite layers 4 of an LC composite electronic device 10 shown in FIG. 2. Incidentally, in FIG. 2, the portion shown by the sign 12 is an inductor portion, and the portion shown by the sign 14 is a capacitor portion.

EXAMPLES

Hereinafter, the present invention will be described based on further detailed examples, but is not limited to the examples.

First, $Fe_2O_3$, $NiO$, $CuO$, and $ZnO$ were prepared as raw materials of a main component, and $SiO_2$, $Bi_2O_3$, and $Co_3O_4$ were prepared as raw materials of an accessory component.

Next, the prepared main component was weighed so that sintered bodies have compositions shown in Table 1 to Table 4, and was subjected to a wet mixing for 16 hours in a ball mill. Then, a raw material mixture was obtained.

Next, the obtained raw material mixture was dried and thereafter calcined at 500° C. to 900° C. in the air, and a calcined powder was obtained. The calcined powder and the raw material powders of the accessory component were subjected to a wet pulverization for 72 hours in a steel ball mill, and a pulverized powder was obtained.

Next, after the pulverized powder was dried, 100 pts.wt. of the pulverized powder was added with 10.0 pts.wt. of a polyvinyl alcohol aqueous solution having a concentration of 6 wt % as a binder, and granulated to be a granule. This granule was pressed into a green compact of a troidal shape (size: outer diameter 13 mm×inner diameter 6 mm×height 3 mm) and a green compact of a disc shape (size: outer diameter 12 mm×height 2 mm) so that a forming density was 3.20 $Mg/m^3$.

Next, each of the green compacts was fired at 900° C., which was equal to or lower than the melting point (962° C.) of Ag, for 2 hours in the air, and troidal core samples as sintered bodies were obtained. Furthermore, the samples were subjected to the following characteristic evaluations. Table 1 to Table 4 show the evaluation results. Incidentally, each element content shown in Table 1 to Table 4 is respectively a value in terms of $Fe_2O_3$, $NiO$, $CuO$, $ZnO$, $SiO_2$, $Co_3O_4$, and $Bi_2O_3$.

Initial Permeability $\mu_i$

The troidal core samples were wound by a copper wire with 10 turns and measured with respect to initial permeability $\mu_i$ at a measurement frequency of 1 MHz and at a measurement temperature of 25° C. using an impedance analyzer (4991A manufactured by Agilent Technologies). In the present examples, an initial permeability $\mu_i$ of 1.5 or more was considered to be favorable.

Frequency Characteristic ($\mu''$ Startup Frequency)

The troidal sample cores whose initial permeability $\mu_i$ had been measured were measured with respect to $\mu''$ by increasing a measurement frequency from 1 MHz. A frequency when exceeding 0.1 is determined as a $\mu''$ startup frequency. A $\mu''$ startup frequency f of 600 MHz or higher is considered to be a favorable frequency characteristic.

Resistivity ρ

An In—Ga electrode was applied on both surfaces of the disc samples, and DC resistance values were measured to calculate resistivity ρ (unit: Ω·m). The DC resistance values were measured using an IR meter (4329A manufactured by HEWLETT PACKARD). In the present examples, a resistivity ρ of $10^6$ Ω·m or more was considered to be favorable.

Temperature Characteristic of Initial Permeability $\mu_i$

A change rate of initial permeability $\mu_i$ between 25° C. and 125° C. was calculated based on a room temperature of 25° C. In the present examples, a change rate of $\mu_i$ of ±30% or less was considered to be favorable.

TABLE 1

| Sample No. | $Fe_2O_3$ [mol %] | NiO [mol %] | CuO [mol %] | ZnO [mol %] | $SiO_2$ [pts. wt.] | $Co_3O_4$ [pts. wt.] | $Bi_2O_3$ [pts. wt.] | Co/Si | Initial permeability $\mu_i$ | Frequency characteristic f [MHz] | Resistivity $\rho$ [$\Omega \cdot$ m] | Temperature characteristic Change rate in $\mu_i$ [%] |
|---|---|---|---|---|---|---|---|---|---|---|---|---|
| 1* | 24.0 | 65.3 | 7.7 | 3.0 | 0.33 | 1.80 | 1.44 | 5.5 | 2.9 | 573 | 1.4E+06 | 11.0% |
| 2 | 24.0 | 65.3 | 7.7 | 3.0 | 0.33 | 2.00 | 1.44 | 6.1 | 2.8 | 701 | 2.6E+06 | 12.5% |
| 3 | 24.0 | 65.3 | 7.7 | 3.0 | 0.33 | 4.00 | 1.44 | 12.1 | 2.4 | 881 | 5.9E+06 | 16.3% |
| 4 | 24.0 | 65.3 | 7.7 | 3.0 | 0.33 | 6.00 | 1.44 | 18.2 | 2.1 | 1150 | 5.1E+06 | 19.1% |
| 5 | 24.0 | 65.3 | 7.7 | 3.0 | 0.33 | 8.00 | 1.44 | 24.2 | 1.9 | 1440 | 5.6E+06 | 21.3% |
| 6* | 24.0 | 65.3 | 7.7 | 3.0 | 0.33 | 10.00 | 1.44 | 30.3 | 1.7 | 1720 | 3.4E+06 | 31.5% |
| 7* | 24.0 | 65.3 | 7.7 | 3.0 | 0.33 | 12.00 | 1.44 | 36.4 | 1.5 | 1999 | 4.2E+06 | 33.0% |
| 11* | 24.0 | 65.3 | 7.7 | 3.0 | 0.36 | 1.80 | 1.44 | 5.0 | 2.8 | 566 | 1.4E+06 | 11.4% |
| 12 | 24.0 | 65.3 | 7.7 | 3.0 | 0.36 | 2.00 | 1.44 | 5.6 | 2.7 | 702 | 2.1E+06 | 13.4% |
| 13 | 24.0 | 65.3 | 7.7 | 3.0 | 0.36 | 4.00 | 1.44 | 11.1 | 2.4 | 877 | 6.1E+06 | 17.0% |
| 14 | 24.0 | 65.3 | 7.7 | 3.0 | 0.36 | 6.00 | 1.44 | 16.7 | 2.0 | 1141 | 4.9E+06 | 19.9% |
| 15 | 24.0 | 65.3 | 7.7 | 3.0 | 0.36 | 8.00 | 1.44 | 22.2 | 1.7 | 1432 | 5.2E+06 | 21.5% |
| 16 | 24.0 | 65.3 | 7.7 | 3.0 | 0.36 | 10.00 | 1.44 | 27.8 | 1.7 | 1811 | 4.5E+06 | 29.6% |
| 17* | 24.0 | 65.3 | 7.7 | 3.0 | 0.36 | 12.00 | 1.44 | 33.3 | 1.5 | 1992 | 4.7E+06 | 33.0% |
| 21* | 24.0 | 65.3 | 7.7 | 3.0 | 0.40 | 1.80 | 1.44 | 4.5 | 2.1 | 581 | 5.6E+05 | 11.5% |
| 22* | 24.0 | 65.3 | 7.7 | 3.0 | 0.40 | 2.00 | 1.44 | 5.0 | 2.2 | 720 | 9.2E+05 | 11.4% |
| 23 | 24.0 | 65.3 | 7.7 | 3.0 | 0.40 | 4.00 | 1.44 | 10.0 | 2.2 | 867 | 4.5E+06 | 17.7% |
| 24 | 24.0 | 65.3 | 7.7 | 3.0 | 0.40 | 6.00 | 1.44 | 15.0 | 2.0 | 1135 | 4.9E+06 | 20.0% |
| 25 | 24.0 | 65.3 | 7.7 | 3.0 | 0.40 | 8.00 | 1.44 | 20.0 | 1.7 | 1425 | 4.9E+06 | 21.7% |
| 26 | 24.0 | 65.3 | 7.7 | 3.0 | 0.40 | 10.00 | 1.44 | 25.0 | 1.6 | 1805 | 2.6E+06 | 29.2% |
| 27* | 24.0 | 65.3 | 7.7 | 3.0 | 0.40 | 12.00 | 1.44 | 30.0 | 1.4 | 1988 | 4.2E+06 | 34.0% |

*Comparative Examples

Samples of Table 1 are a sample whose all compositions other than Co and Si are the same within the ranges of the present invention and only Co content was changed based on a fixed Si content of 0.33, 0.36, or 0.40 pts.wt.

Table 1 shows that when all compositions of the main component and the accessory component were within the ranges of the present invention, initial permeability $\mu_i$, resistivity $\rho$, frequency characteristic, and temperature characteristic of initial permeability $\mu_i$ were favorable.

On the other hand, Sample No. 1, Sample No. 11, and Sample No. 21, whose Co content was too small as the accessory component, were unfavorable with respect to frequency characteristic or resistivity $\rho$. Sample No. 22, whose Co content was within the range of the present invention but Co/Si was too small, was also unfavorable with respect to resistivity $\rho$.

Sample No. 7, Sample No. 17, and Sample No. 27, whose Co content was too large, were unfavorable with respect to temperature characteristic of initial permeability $\mu_i$. Sample No. 27 was unfavorable with respect to initial permeability $\mu_i$ as well. Moreover, Sample No. 6, whose Co content was within the range of the present invention but Co/Si was too large, was also unfavorable with respect to temperature characteristic of initial permeability $\mu_i$.

TABLE 2

| Sample No. | $Fe_2O_3$ [mol %] | NiO [mol %] | CuO [mol %] | ZnO [mol %] | $SiO_2$ [pts. wt.] | $Co_3O_4$ [pts. wt.] | $Bi_2O_3$ [pts. wt.] | Co/Si | Initial permeability $\mu_i$ | Frequency characteristic f [MHz] | Resistivity $\rho$ [$\Omega \cdot$ m] | Temperature characteristic Change rate in $\mu_i$ [%] |
|---|---|---|---|---|---|---|---|---|---|---|---|---|
| 31* | 24.0 | 65.3 | 7.7 | 3.0 | 0.10 | 2.00 | 1.44 | 20.0 | 2.9 | 705 | 6.9E+06 | 31.3% |
| 32 | 24.0 | 65.3 | 7.7 | 3.0 | 0.30 | 2.00 | 1.44 | 6.7 | 2.9 | 712 | 4.1E+06 | 13.4% |
| 2 | 24.0 | 65.3 | 7.7 | 3.0 | 0.33 | 2.00 | 1.44 | 6.1 | 2.8 | 701 | 2.6E+06 | 12.5% |
| 12 | 24.0 | 65.3 | 7.7 | 3.0 | 0.36 | 2.00 | 1.44 | 5.6 | 2.7 | 702 | 2.1E+06 | 13.4% |
| 22* | 24.0 | 65.3 | 7.7 | 3.0 | 0.40 | 2.00 | 1.44 | 5.0 | 2.2 | 720 | 9.2E+05 | 11.4% |
| 36* | 24.0 | 65.3 | 7.7 | 3.0 | 0.10 | 4.80 | 1.44 | 48.0 | 2.3 | 1111 | 7.6E+06 | 35.6% |
| 37 | 24.0 | 65.3 | 7.7 | 3.0 | 0.30 | 4.80 | 1.44 | 16.0 | 2.3 | 1115 | 4.8E+06 | 15.8% |
| 38 | 24.0 | 65.3 | 7.7 | 3.0 | 0.50 | 4.80 | 1.44 | 9.6 | 2.2 | 1105 | 2.7E+06 | 13.9% |
| 39 | 24.0 | 65.3 | 7.7 | 3.0 | 0.88 | 4.80 | 1.44 | 5.5 | 2.1 | 1111 | 2.7E+06 | 18.3% |
| 40* | 24.0 | 65.3 | 7.7 | 3.0 | 1.20 | 4.80 | 1.44 | 4.0 | 1.4 | 1121 | 8.4E+05 | 14.7% |
| 41* | 24.0 | 65.3 | 7.7 | 3.0 | 0.10 | 9.00 | 1.44 | 90.0 | 1.9 | 1692 | 7.8E+06 | 39.0% |
| 42 | 24.0 | 65.3 | 7.7 | 3.0 | 0.30 | 9.00 | 1.44 | 30.0 | 1.9 | 1705 | 4.9E+06 | 22.8% |
| 43 | 24.0 | 65.3 | 7.7 | 3.0 | 1.00 | 9.00 | 1.44 | 9.0 | 1.8 | 1680 | 3.2E+06 | 20.4% |
| 44 | 24.0 | 65.3 | 7.7 | 3.0 | 1.65 | 9.00 | 1.44 | 5.5 | 1.7 | 1695 | 2.5E+06 | 17.9% |
| 45* | 24.0 | 65.3 | 7.7 | 3.0 | 1.83 | 9.00 | 1.44 | 4.9 | 1.4 | 1710 | 8.0E+05 | 12.3% |
| 46* | 24.0 | 65.3 | 7.7 | 3.0 | 0.10 | 10.00 | 1.44 | 100.0 | 1.8 | 1812 | 6.9E+06 | 52.3% |
| 47* | 24.0 | 65.3 | 7.7 | 3.0 | 0.30 | 10.00 | 1.44 | 33.3 | 1.8 | 1827 | 5.0E+06 | 45.9% |
| 16 | 24.0 | 65.3 | 7.7 | 3.0 | 0.36 | 10.00 | 1.44 | 27.8 | 1.7 | 1811 | 4.5E+06 | 29.6% |
| 26 | 24.0 | 65.3 | 7.7 | 3.0 | 0.40 | 10.00 | 1.44 | 25.0 | 1.6 | 1805 | 2.6E+06 | 29.2% |
| 48 | 24.0 | 65.3 | 7.7 | 3.0 | 1.00 | 10.00 | 1.44 | 10.0 | 1.6 | 1834 | 2.8E+06 | 26.2% |
| 49 | 24.0 | 65.3 | 7.7 | 3.0 | 1.83 | 10.00 | 1.44 | 5.5 | 1.5 | 1933 | 1.5E+06 | 19.4% |
| 50* | 24.0 | 65.3 | 7.7 | 3.0 | 2.00 | 10.00 | 1.44 | 5.0 | 1.3 | 1949 | 7.5E+05 | 16.4% |

*Comparative Examples

Samples of Table 2 are a sample whose all compositions other than Co and Si are the same within the ranges of the present invention and only Si content was changed based on a fixed Co content of 2.00, 4.80, 9.00, or 10.00 pts.wt.

Table 2 shows that when all compositions of the main component and the accessory component were within the ranges of the present invention, initial permeability $\mu_i$, resistivity $\rho$, frequency characteristic, and temperature characteristic of initial permeability $\mu_i$ were favorable.

On the other hand, Sample No. 31, Sample No. 36, Sample No. 41, and Sample No. 46, whose Si content was too small as the accessory component, were unfavorable with respect to temperature characteristic of initial permeability $\mu_i$. Sample No. 47, whose Si content was within the range of the present invention but Co/Si was too large, was also unfavorable with respect to temperature characteristic of initial permeability $\mu_i$.

Sample No. 50, whose Si content was too large, was unfavorable with respect to initial permeability $\mu_i$ and resistivity $\rho$. Moreover, Sample No. 22, Sample No. 40, and Sample No. 45, whose Si content was within the range of the present invention but Co/Si was too small, were unfavorable with respect to resistivity $\rho$. Sample No. 40 and Sample No. 45 were also unfavorable with respect to initial permeability $\mu_i$.

TABLE 3

| Sample No. | $Fe_2O_3$ [mol %] | NiO [mol %] | CuO [mol %] | ZnO [mol %] | $SiO_2$ [pts. wt.] | $Co_3O_4$ [pts. wt.] | $Bi_2O_3$ [pts. wt.] | Co/Si | Initial permeability $\mu_i$ | Frequency characteristic f [MHz] | Resistivity $\rho$ [$\Omega \cdot$ m] | Temperature characteristic Change rate in $\mu_i$ [%] |
|---|---|---|---|---|---|---|---|---|---|---|---|---|
| 51* | 15.0 | 74.3 | 7.7 | 3.0 | 0.36 | 2.00 | 1.44 | 5.6 | 1.4 | 753 | 4.4E+06 | 12.9% |
| 52 | 18.0 | 71.3 | 7.7 | 3.0 | 0.36 | 2.00 | 1.44 | 5.6 | 2.1 | 720 | 3.9E+06 | 14.2% |
| 12 | 24.0 | 65.3 | 7.7 | 3.0 | 0.36 | 2.00 | 1.44 | 5.6 | 2.7 | 702 | 2.1E+06 | 13.4% |
| 53 | 30.0 | 59.3 | 7.7 | 3.0 | 0.36 | 2.00 | 1.44 | 5.6 | 3.1 | 630 | 4.1E+06 | 23.5% |
| 54* | 32.0 | 57.3 | 7.7 | 3.0 | 0.36 | 2.00 | 1.44 | 5.6 | 3.5 | 590 | 4.2E+06 | 30.5% |
| 61* | 24.0 | 70.0 | 3.0 | 3.0 | 0.36 | 2.00 | 1.44 | 5.6 | 1.9 | 743 | 8.4E+05 | 32.2% |
| 62 | 24.0 | 69.0 | 4.0 | 3.0 | 0.36 | 2.00 | 1.44 | 5.6 | 2.2 | 732 | 4.2E+06 | 24.6% |
| 12 | 24.0 | 65.3 | 7.7 | 3.0 | 0.36 | 2.00 | 1.44 | 5.6 | 2.7 | 702 | 2.1E+06 | 13.4% |
| 63 | 24.0 | 61.0 | 12.0 | 3.0 | 0.36 | 2.00 | 1.44 | 5.6 | 2.6 | 707 | 3.7E+06 | 12.5% |
| 64 | 24.0 | 59.0 | 14.0 | 3.0 | 0.36 | 2.00 | 1.44 | 5.6 | 2.0 | 766 | 3.1E+06 | 13.4% |
| 65* | 24.0 | 57.0 | 16.0 | 3.0 | 0.36 | 2.00 | 1.44 | 5.6 | 1.4 | 770 | 3.9E+06 | 13.9% |
| 71 | 24.0 | 68.3 | 7.7 | 0.0 | 0.36 | 2.00 | 1.44 | 5.6 | 1.6 | 810 | 5.8E+06 | 12.5% |
| 72 | 24.0 | 67.3 | 7.7 | 1.0 | 0.36 | 2.00 | 1.44 | 5.6 | 1.9 | 793 | 4.7E+06 | 13.5% |
| 73 | 24.0 | 66.3 | 7.7 | 2.0 | 0.36 | 2.00 | 1.44 | 5.6 | 2.3 | 744 | 4.0E+06 | 10.9% |
| 12 | 24.0 | 65.3 | 7.7 | 3.0 | 0.36 | 2.00 | 1.44 | 5.6 | 2.7 | 702 | 2.1E+06 | 13.4% |
| 74 | 24.0 | 64.3 | 7.7 | 4.0 | 0.36 | 2.00 | 1.44 | 5.6 | 3.6 | 662 | 3.9E+06 | 13.1% |
| 75 | 24.0 | 62.3 | 7.7 | 6.0 | 0.36 | 2.00 | 1.44 | 5.6 | 6.0 | 602 | 4.4E+06 | 12.9% |
| 76* | 24.0 | 60.3 | 7.7 | 8.0 | 0.36 | 2.00 | 1.44 | 5.6 | 10.0 | 549 | 4.5E+06 | 11.1% |
| 81 | 18.0 | 78.0 | 4.0 | 0.0 | 0.36 | 2.00 | 1.44 | 5.6 | 2.1 | 721 | 5.6E+06 | 14.9% |
| 12 | 24.0 | 65.3 | 7.7 | 3.0 | 0.36 | 2.00 | 1.44 | 5.6 | 2.7 | 702 | 2.1E+06 | 13.4% |
| 82 | 30.0 | 50.0 | 14.0 | 6.0 | 0.36 | 2.00 | 1.44 | 5.6 | 2.0 | 733 | 4.7E+06 | 15.0% |

*Comparative Examples

Samples of Table 3 are a sample whose main component content was changed from that of Sample No. 12.

Table 3 shows that when all compositions of the main component and the accessory component were within the ranges of the present invention, initial permeability $\mu_i$, resistivity $\rho$, frequency characteristic, and temperature characteristic of initial permeability $\mu_i$ were favorable.

On the other hand, Comparative Examples, whose main component content was out of the range of the present invention, had an unfavorable value of resistivity $\rho$, frequency characteristic, temperature characteristic of initial permeability $\mu_i$, and/or initial permeability $\mu_i$.

TABLE 4

| Sample No. | $Fe_2O_3$ [mol %] | NiO [mol %] | CuO [mol %] | ZnO [mol %] | $SiO_2$ [pts. wt.] | $Co_3O_4$ [pts. wt.] | $Bi_2O_3$ [pts. wt.] | Co/Si | Relative density [%] | Initial permeability $\mu_i$ | Frequency characteristic f [MHz] | Resistivity $\rho$ [$\Omega \cdot$ m] | Temperature characteristic Change rate in $\mu_i$ [%] |
|---|---|---|---|---|---|---|---|---|---|---|---|---|---|
| 91* | 24.0 | 65.3 | 7.7 | 3.0 | 0.36 | 2.00 | 0.50 | 5.6 | 85.80% | 1.3 | 716 | 4.4E+05 | 9.9% |
| 92 | 24.0 | 65.3 | 7.7 | 3.0 | 0.36 | 2.00 | 1.00 | 5.6 | 99.10% | 2.6 | 704 | 4.6E+06 | 10.8% |
| 12 | 24.0 | 65.3 | 7.7 | 3.0 | 0.36 | 2.00 | 1.44 | 5.6 | 99.29% | 2.7 | 702 | 2.1E+06 | 13.4% |
| 93 | 24.0 | 65.3 | 7.7 | 3.0 | 0.36 | 2.00 | 2.00 | 5.6 | 99.38% | 2.7 | 703 | 4.9E+06 | 12.8% |
| 94 | 24.0 | 65.3 | 7.7 | 3.0 | 0.36 | 2.00 | 3.00 | 5.6 | 99.60% | 2.6 | 705 | 4.5E+06 | 13.9% |
| 95* | 24.0 | 65.3 | 7.7 | 3.0 | 0.36 | 2.00 | 4.00 | 5.6 | 99.99% | 2.5 | 710 | 2.8E+05 | 16.8% |

*Comparative Examples

Sample No. 91 to Sample No. 95 of Table 4 are a sample whose compositions other than Bi are the same as those of Sample No. 12 and Bi content was only changed. Sample No. 12 and Sample No. 91 to Sample No. 95 of Table 4 were also measured with respect to relative density for confirmation of sinterability.

In the measurement of relative density, a sintered body density of the sintered body obtained by pressing into a disc shape was calculated from size and weight of the sintered body after firing, and the sintered body density with respect to theoretical density was determined as a relative density. In the present examples, a relative density of 95% or more was considered to be favorable.

Table 4 shows that when all compositions of the main component and the accessory component were within the ranges of the present invention, initial permeability $\mu_i$, resistivity $\rho$, relative density (sinterability), frequency characteristic, and temperature characteristic of initial permeability $\mu_i$ were favorable.

On the other hand, Sample No. 91, whose Bi content was too small, had a low relative density. That is, Sample No. 91 had an extremely low sinterability and consequently had unfavorable values of initial permeability $\mu_i$ and resistivity $\rho$. Sample No. 95, whose Bi content was too large, had a deteriorated resistivity $\rho$.

NUMERICAL REFERENCES

1 . . . multilayer inductor
2 . . . element
3 . . . terminal electrode
4 . . . laminated body
5 . . . coil conductor
5a, 5b . . . leading electrode
10 . . . LC composite electronic device
12 . . . inductor portion
14 . . . capacitor portion

The invention claimed is:
1. A ferrite composition comprising a main component and an accessory component, wherein
    the main component includes:
        18.0 to 30.0 mol % of iron oxide in terms of $Fe_2O_3$;
        4 to 14 mol % of copper oxide in terms of CuO;
        0 to 6.0 mol % of zinc oxide in terms of ZnO; and
        a remaining part of nickel oxide,
    the accessory component includes:
        0.30 to 1.83 pts. wt. of silicon compound in terms of $SiO_2$;
        4.00 to 10.00 pts. wt. of cobalt compound in terms of $Co_3O_4$; and
        1.00 to 3.00 pts. wt. of bismuth compound in terms of $Bi_2O_3$ with respect to 100 pts. wt. of the main component, and
        a cobalt compound content in terms of $Co_3O_4$ divided by a silicon compound content in terms of $SiO_2$ is a value of 5.5 to 30.0.
2. An electronic device comprising a ferrite sintered body composed of the ferrite composition according to claim 1.

* * * * *